(No Model.)

J. NORRIS.
CUSHIONED NIPPERS AND PLIERS FOR GLASS CUTTERS' USE.

No. 331,812. Patented Dec. 8, 1885.

WITNESSES:
Chas. S. Gooding.
Eugene Humphrey

INVENTOR:
Jeremiah Norris
per Porter & Hutchinson
Attys.

UNITED STATES PATENT OFFICE.

JEREMIAH NORRIS, OF CHELSEA, MASSACHUSETTS.

CUSHIONED NIPPERS AND PLIERS FOR GLASS-CUTTERS' USE.

SPECIFICATION forming part of Letters Patent No. 331,812, dated December 8, 1885.

Application filed March 7, 1885. Serial No. 158,024. (No model.)

*To all whom it may concern:*

Be it known that I, JEREMIAH NORRIS, of Chelsea, in the county of Suffolk and State of Massachusetts, have invented a new and useful Improvement in Cushioned Nippers and Pliers for Glass-Cutter's Use, which will, in connection with the accompanying drawings, be hereinafter fully described, and specifically defined in the appended claims.

The invention has for its object an improvement in nippers and pliers, and it will, in connection with the accompanying drawings, be hereinafter fully described and definitely claimed.

Figure 1:
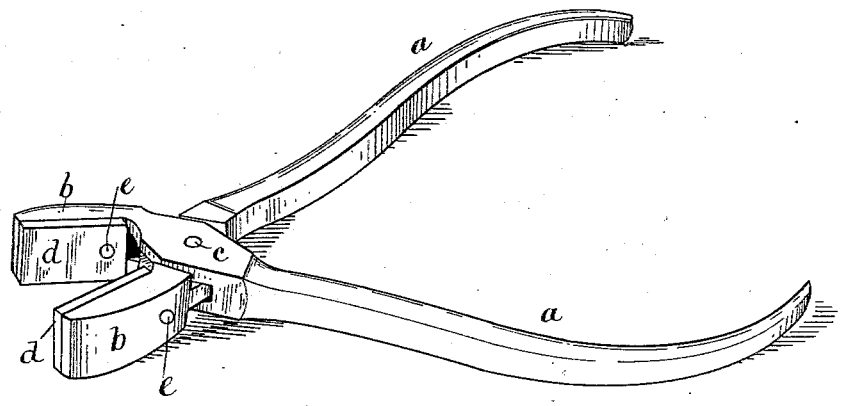
Figure 2:
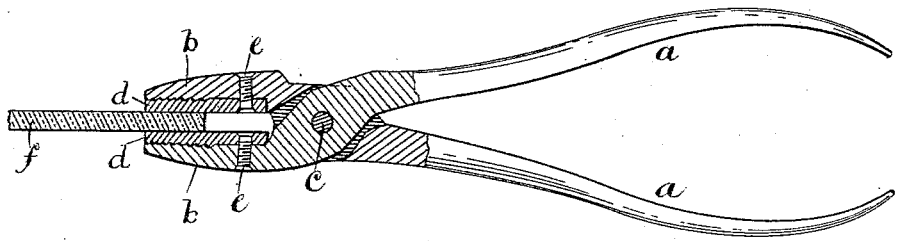

In said drawings, Figure 1 is a perspective view of a pair of pinchers embodying my invention. Fig. 2 is a longitudinal section through the jaw portion of the pinchers shown in Fig. 1, and taken at right angles to the pivotal axis of the two parts thereof.

In said views, $a\ a$ represent the handles of the pinchers, which respectively terminate in a properly-formed jaw, $b$, one of said handles being inserted in the other, and the two being pivotally united by the pivot $c$ in the common and well known manner. Each jaw $b$ is so formed and arranged relatively to its handle $a$, that when the halves of the pinchers are united upon pivot $c$, and the adjacent faces of the jaws are parallel to each other, the distance between these faces of the nippers will be so much greater than heretofore, as equals the thickness of the cushions $d$, in order that when said cushions are secured to the jaws and the latter are in position so that the adjacent faces of the cushions are parallel, the distance between them shall be practically equal to that between the adjacent faces of the jaws of pinchers when so arranged and not so provided with such cushions. Said cushions $d$ are preferably secured to jaws $b$ by a rivet, $e$, passing through both the cushion and jaw near the inner end of each, and by the embedding the serrations or raised teeth of the jaws in the cushion by pressure duly applied thereto.

This improvement in pinchers and pliers is especially useful in connection with the art of cutting sheet and plate glass, as after the action of the diamond thereon it is usually necessary to remove the redundant portion, often consisting of a very narrow strip, which must be broken from the main portion along the line of cut of the diamond by canting or twisting it out of plane with the main portion; and in order to act with sufficient force upon said narrow strip considerable force must be exerted thereon with the pinchers, and in doing this if the unyielding metal is in direct contact with the glass there is great danger of transverse fractures, or of breaking beyond the line of the diamond-mark, and hence it is often necessary to place cloth between the jaws of the nippers and the glass, to prevent such injurious fractures; but the employment of such temporary expedient is both inconvenient and unsatisfactory, as the grip upon the glass is not sufficient to insure the breaking thereof, especially when the part to be removed is narrow and the plate of glass is thick. I have found by experiment that thoroughly-dried compact rawhide gives most satisfactory results when employed as such cushion, as it does not become displaced by pressure, while it gives a firm and tenacious grip or hold upon the glass, and besides the roughened or toothed projections upon the jaws of the nippers, when embedded in it, serve to hold the outer portions firmly in place, the rivets $e$ being necessarily located as near as is practicable to the inner ends of the jaws in order that they may not come in contact with the glass, as they would in such case cause transverse fractures therein.

While I do not confine myself to rawhide as the cushion for nippers and pliers, yet it is the best material known to me for that purpose for the reasons above stated.

In Fig. 2 is shown the application of the pinchers to the glass $f$, when breaking the same.

I claim as my invention—

As an improvement in pinchers and pliers, a cushion of rawhide or other suitable slightly-yielding material secured to the abutting faces of the jaws in the manner to allow the engagement thereof with the glass or other material without contact between the metal and glass, substantially as specified.

JEREMIAH NORRIS.

Witnesses:
T. W. PORTER,
W. A. COPELAND.